(12) United States Patent
Cadoux et al.

(10) Patent No.: US 11,612,958 B2
(45) Date of Patent: Mar. 28, 2023

(54) POWDER FEED SYSTEM AND METHOD FOR 3D PRINTING BY POWDER SPRAYING

(71) Applicant: AddUp, Cebazat (FR)

(72) Inventors: Guillaume Cadoux, Gagnac sur Cere (FR); Jean-Luc Sebal, Montvalent (FR)

(73) Assignee: ADDUP, Cebazat (FR)

( * ) Notice: Subject to any disclaimer, the term of this patent is extended or adjusted under 35 U.S.C. 154(b) by 359 days.

(21) Appl. No.: 16/631,589

(22) PCT Filed: Jul. 17, 2018

(86) PCT No.: PCT/EP2018/069366
§ 371 (c)(1),
(2) Date: Jan. 16, 2020

(87) PCT Pub. No.: WO2019/016195
PCT Pub. Date: Jan. 24, 2019

(65) Prior Publication Data
US 2020/0164467 A1    May 28, 2020

(30) Foreign Application Priority Data
Jul. 17, 2017    (FR) ..................... 17 56756

(51) Int. Cl.
*B23K 26/342*    (2014.01)
*B33Y 10/00*    (2015.01)
(Continued)

(52) U.S. Cl.
CPC .......... *B23K 26/342* (2015.10); *B22F 12/226* (2021.01); *B23K 26/144* (2015.10);
(Continued)

(58) Field of Classification Search
CPC ................ B23K 26/342; B23K 26/144; B23K 26/1464; B33Y 10/00; B33Y 30/00;
(Continued)

(56) References Cited

U.S. PATENT DOCUMENTS 10,220,473 B2    3/2019 Ohno et al.
2002/0171183 A1    11/2002 McGregor
(Continued)

FOREIGN PATENT DOCUMENTS

EP    3189925 A1    7/2017
WO    2016/044876 A1    3/2016

OTHER PUBLICATIONS

International Search Report, dated Oct. 22, 2018, from corresponding PCT application No. PCT/EP2018/069366.

*Primary Examiner* — John J Norton
*Assistant Examiner* — Simpson A Chen
(74) *Attorney, Agent, or Firm* — Venable LLP

(57) ABSTRACT

Disclosed is a switching system for a facility for 3D printing by spraying at least a first powder, including a body defining: at least one first upstream gas conduit configured to receive a gas; at least one first upstream powder conduit configured to receive the first powder; at least one first downstream discharge conduit for discharging the first powder; and a downstream work conduit configured in order to supply a nozzle designed for depositing at least the first powder. The system further includes a distributor that is movable with respect to the body, preferably in rotation about an axis, between a rest position, in which the first upstream powder conduit is fluidly connected, via the distributor, to the first downstream discharge conduit, and at least a first supply position, in which the first upstream powder conduit is fluidly connected, via the distributor, to the downstream work conduit.

17 Claims, 5 Drawing Sheets

Figure 1:
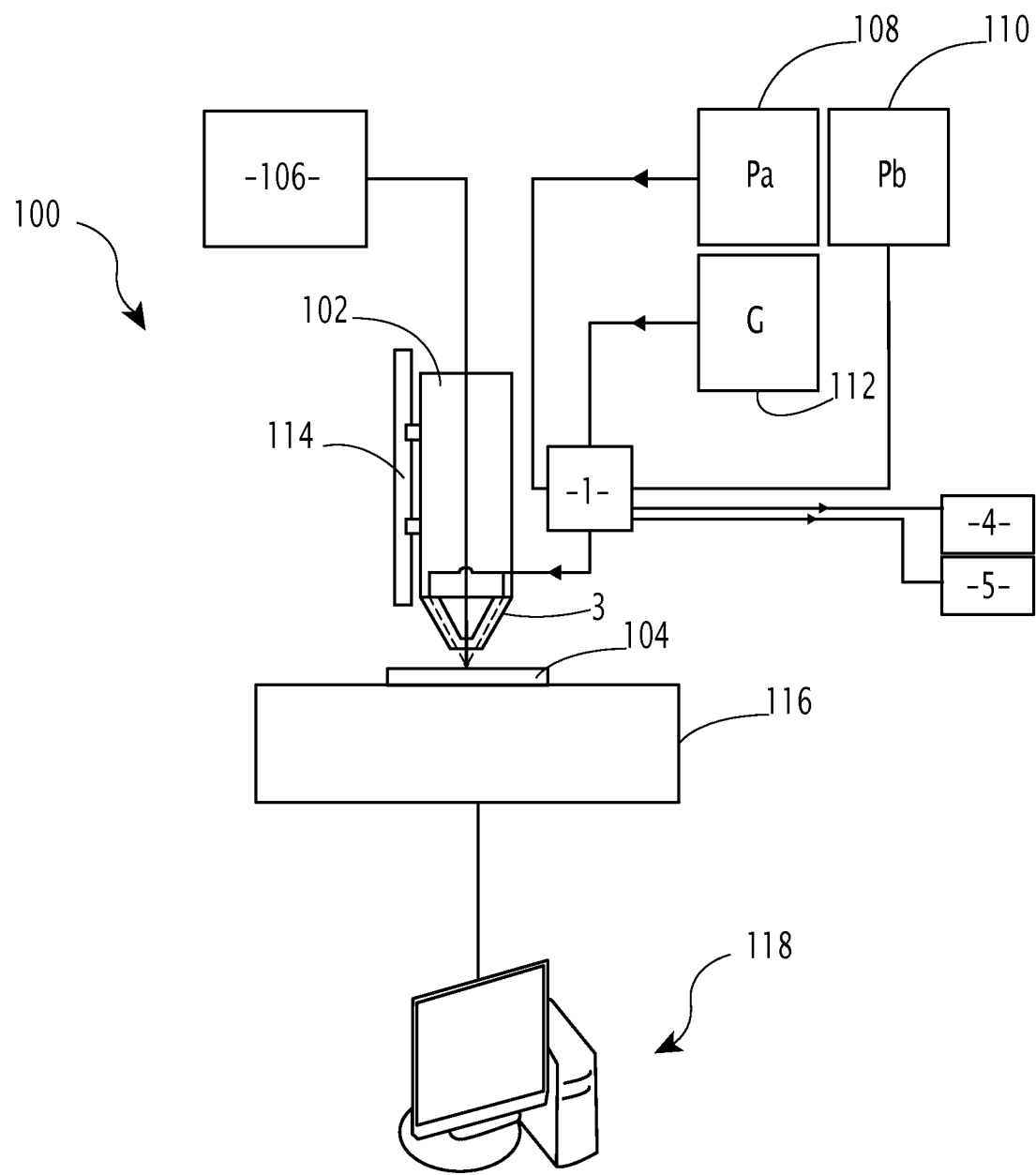

(51) Int. Cl.
    *B33Y 30/00*      (2015.01)
    *B23K 26/144*     (2014.01)
    *B23K 26/14*      (2014.01)
    *B22F 12/00*      (2021.01)
    *B22F 10/73*      (2021.01)
    *B22F 12/53*      (2021.01)

(52) U.S. Cl.
    CPC .......... *B23K 26/1464* (2013.01); *B33Y 10/00*
        (2014.12); *B33Y 30/00* (2014.12); *B22F 10/73*
                        (2021.01); *B22F 12/53* (2021.01)

(58) Field of Classification Search
    CPC .......... B22F 10/73; B22F 10/25; B22F 10/10;
            B22F 10/00; B22F 12/53; B22F 12/70;
            B22F 299/00; Y02P 10/25; B29C 64/153;
                        B29C 64/209; B29C 64/371
    USPC ....................................................... 219/76.1
    See application file for complete search history.

(56)            References Cited

U.S. PATENT DOCUMENTS

2003/0206820 A1*  11/2003  Keicher ................ B29C 64/153
                                                    419/9
2005/0133527 A1    6/2005  Dullea et al.
2017/0203391 A1*   7/2017  Budge .................... B22F 10/20
2017/0259378 A1*   9/2017  Ohno .................... B23K 26/144
2020/0262148 A1    8/2020  Sebal et al.
2022/0118523 A1    4/2022  Sebal et al.

* cited by examiner

POWDER FEED SYSTEM AND METHOD FOR 3D PRINTING BY POWDER SPRAYING

BACKGROUND OF THE INVENTION

Field of the Invention

The invention relates to a switching system for a 3D printing facility by spraying at least a first powder, as well as such a facility and a method implementing such a system.

The invention for example relates to the field of quick manufacturing and the repair of three-dimensional metal parts directly from a computer-assisted design (CAD). The invention relates to a system and improvements to material distribution methods directly to produce a shape, generally called laser construction by direct addition of material that makes it possible to produce functional parts by melting metal powders by laser.

Description of Related Art

Additive construction or recharging by spraying metal powder or laser metal deposition (LMD) methods consist of melting metal powders with a laser or another melting method in order to generate a deposit with perfectly controlled dimensions. The layers of material are successively stacked in order to create functional technical parts. This manufacturing method by 3D printing can be used in many technical fields ranging from automotive to aeronautic.

More specifically, in LMD, the successive layers of metal powder are injected directly under a laser that melts the new layer with the previous one. Advantageously, this technique is based on a printing head. The head or the part being movable on at least one axis, the powder is therefore sprayed exactly below the beam of the laser. The powder can have granulometric characteristics that vary depending on the technology used. Currently, LMD techniques make it possible to save material relative to conventional machining, in which the removal of material can reach up to 80% of the finished part. Given the cost of the materials used in the industry, industrialists look for techniques making it possible to decrease material consumption. Thus, the players in additive manufacturing try to reduce the quantity of powder used while preserving the mechanical properties of the parts produced.

Currently, LMD 3D printing machines have at least one powder distributor generally located outside the chamber of the machine for bulk, filling and maintenance reasons. The distributor continuously dispenses powder via a flexible hose, toward the injection nozzle. The injection nozzle guides the powder toward the beam of the laser. The powder is generally conveyed in a stream of carrier gas, for example argon, to allow it to move. The gas flow rate generally does not vary during manufacturing.

Generally, the carrier gas flow rate is about 3 liters per minute for a tube measuring 4 mm in inner diameter.

Currently, the large distance between the distributor and the nozzle causes a substantial response time between the departure and the arrival of the powder (about 10 seconds for a current configuration). This response time is detrimental to the development of this technology, since the response time prevents the ability to stop the powder flow rate between two movements of the printing head without a laser firing.

One of the ways to reduce needless powder consumption considered by industrialists is to interrupt, on demand, the flow of powder toward the nozzle by means of a simple solenoid valve. This technique has the drawback that the dispensing channels for the powder tend to become plugged when they are no longer ventilated. Known is US-A-2005/133527, which discloses a directional valve making it possible to partially orient the flow of powder toward a discharge or toward the laser. This technique does not fully resolve the problem of wasted powder and does not apply to systems using several types of powders to manufacture a multi-metal part.

The present invention therefore aims to address the aforementioned drawback, in particular by proposing a switching system for a 3D printing device by spraying powder, able to very quickly interrupt the powder flow rate in the LMD nozzle, while allowing the recycling of the unused powder, and allowing the very quick reestablishment of the powder flow rate in the LMD nozzle when the manufacturing process requires it.

BRIEF SUMMARY OF THE INVENTION

To that end, the invention relates to a switching system for a facility for 3D printing by spraying at least a first powder, the switching system comprising a body defining:
- at least one first upstream gas conduit configured to receive a gas,
- at least one first upstream powder conduit configured to receive the first powder,
- at least one first downstream discharge conduit for discharging the first powder, and
- a downstream work conduit configured in order to supply a nozzle designed for depositing at least the first powder, further comprising a distributor that is movable with respect to the body, preferably in rotation about an axis, between a rest position, in which the first upstream powder conduit is fluidly connected, via the distributor, to the first downstream discharge conduit, and at least a first supply position, in which the first upstream powder conduit is fluidly connected, via the distributor, to the downstream work conduit.

According to specific embodiments, the switching system comprises one or more of the following features, considered alone or according to all technically possible combinations:
- the distributor defines an inner channel configured to place the first upstream powder conduit in fluid continuity with the downstream work conduit in the first supply position, and an inner channel configured to place the first upstream powder conduit in fluid continuity with the first downstream discharge conduit in the rest position;
- in the supply position, the first upstream gas conduit is connected by the distributor to the first downstream discharge conduit, preferably by an inner channel defined by the distributor, and in the rest position, the first upstream gas conduit is fluidly connected by the distributor to the downstream work conduit;
- the body further defines a second upstream powder conduit configured to receive a second powder that is advantageously different from the first powder and configured to be sprayed by the 3D printing facility, and a second downstream discharge conduit in order to discharge the second powder, the second upstream powder conduit being fluidly connected by the distributor to the second downstream discharge conduit in the first supply position, the distributor further being movable relative to the body, preferably in rotation about the axis, toward a second supply position, in which the second upstream powder conduit is fluidly connected by the distributor to the downstream work conduit and in which the first upstream powder conduit is fluidly connected by the distributor to the first downstream discharge conduit;

the distributor defines an inner channel configured to place the first upstream powder conduit in fluid continuity with the downstream work conduit in the first supply position, and to place the second upstream powder conduit in fluid continuity with the downstream work conduit in the second supply position, and an inner channel configured to place the first upstream powder conduit in fluid continuity with the first downstream discharge conduit in the second supply position, and to place the second upstream powder conduit in fluid continuity with the second downstream discharge conduit in the first supply position;

the body further defines a second upstream gas conduit configured to receive a gas; in the second supply position, the second upstream gas conduit is connected by the distributor to the first downstream discharge conduit, preferably by an inner channel defined by the distributor;

the body defines: N upstream powder conduits configured to receive N powders that are advantageously distinct in themselves and configured to be sprayed by the 3D printing facility, N being an integer greater than or equal to 3; and N downstream discharge conduits configured respectively to discharge the N powders, the distributor being movable relative to the body, preferably by rotation around the axis, between at least N supply positions, in which respectively one of the N upstream powder conduits is fluidly connected by the distributor to the downstream work conduit and in which the others of the N upstream powder conduits are fluidly connected by the distributor respectively to the downstream discharge conduits; and the body defines a housing receiving the distributor, the housing being delimited by a radially inner wall of the body, the wall defining a first circular groove configured to form a gas collector, the wall further defining cells in fluid communication with the first groove and configured to be across from the N downstream discharge conduits, and/or a second circular groove configured to form a gas collector, the wall further defining cells in fluid communication with the second groove and configured to be across from the N upstream powder conduits.

According to another aspect, the invention relates to a facility for 3D printing by spraying at least a first powder, the facility for 3D printing comprising:

a switching system as defined above, and a nozzle designed for depositing at least the first powder, the nozzle being configured to be supplied with the first powder by the downstream work conduit in the supply position.

According to another aspect, the invention also relates to a powder switching method configured to be implemented in [a] facility for 3D printing by spraying at least a first powder, the method comprising the following steps:

providing a switching system, placing the distributor in the first supply position, receiving a gas via the first upstream gas conduit, receiving the first powder in the first upstream powder conduit, supplying the nozzle with the first powder via the downstream work conduit, and depositing the first powder via the nozzle, placing the distributor in the rest position, and discharging the first powder via the first downstream discharge conduit.

According to one particular embodiment, the method is such that:

in the step of providing the switching system, the body defines a plurality of upstream powder conduits configured to receive a plurality of powders that are advantageously distinct in themselves, a plurality of downstream discharge conduits to respectively discharge the powders, the distributor being movable relative to the body, preferably in rotation about the axis, between a plurality of supply positions, in which one of the upstream powder conduits is respectively fluidly connected by the distributor to the downstream work conduit and in which the others of the upstream powder conduits are fluidly connected by the distributor to the downstream discharge conduits, the method implements a plurality of supply sources supplying the powders, and the distributor is moved between the plurality of positions.

BRIEF DESCRIPTION OF THE SEVERAL VIEWS OF THE DRAWING(S)

Figure 2:
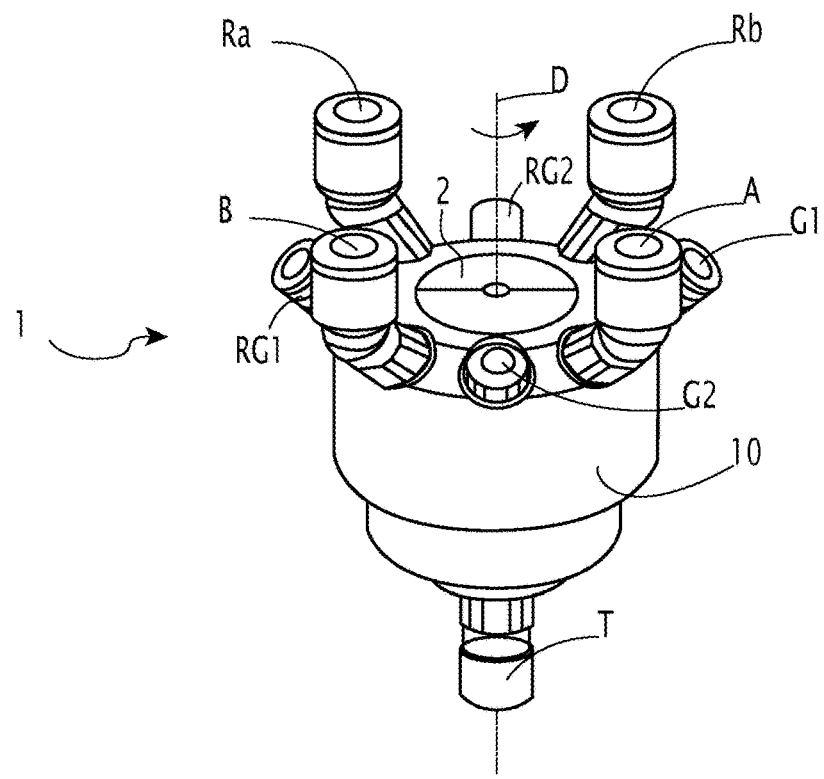
Figure 3:
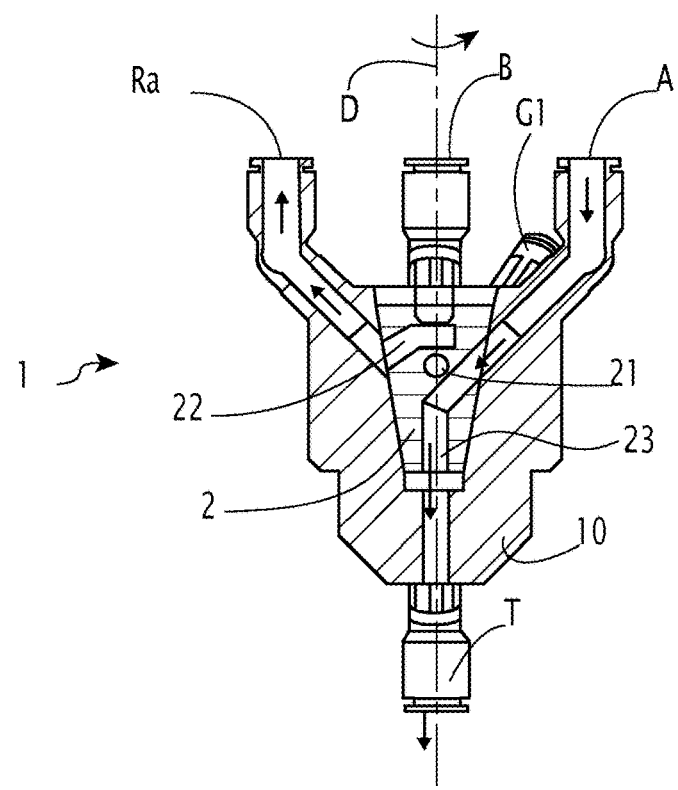
Figure 4:
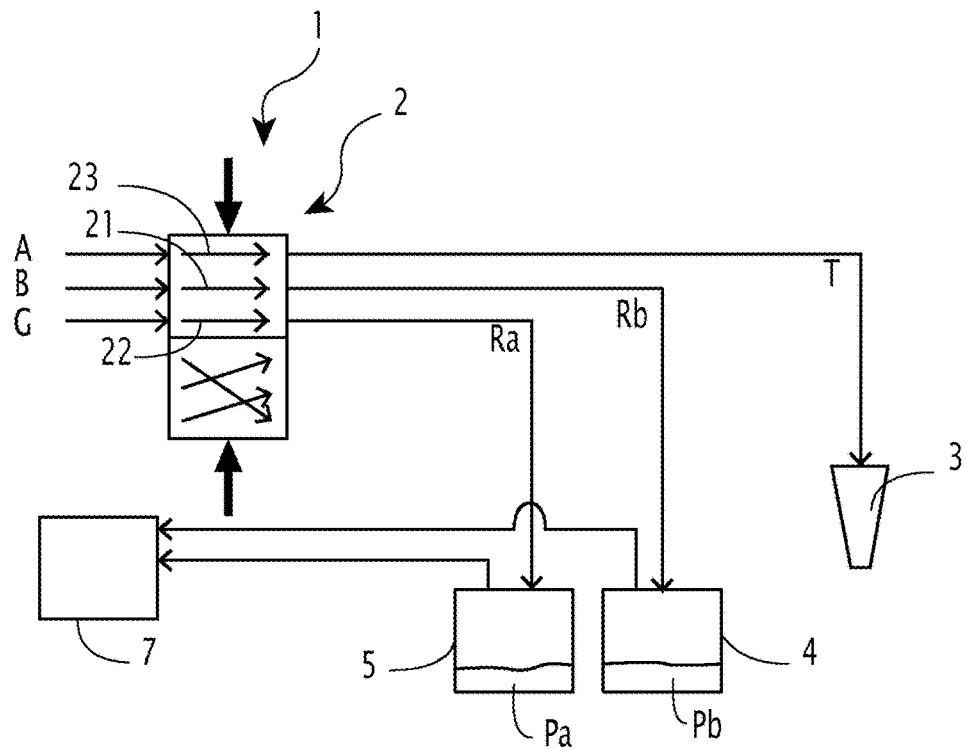
Figure 5:
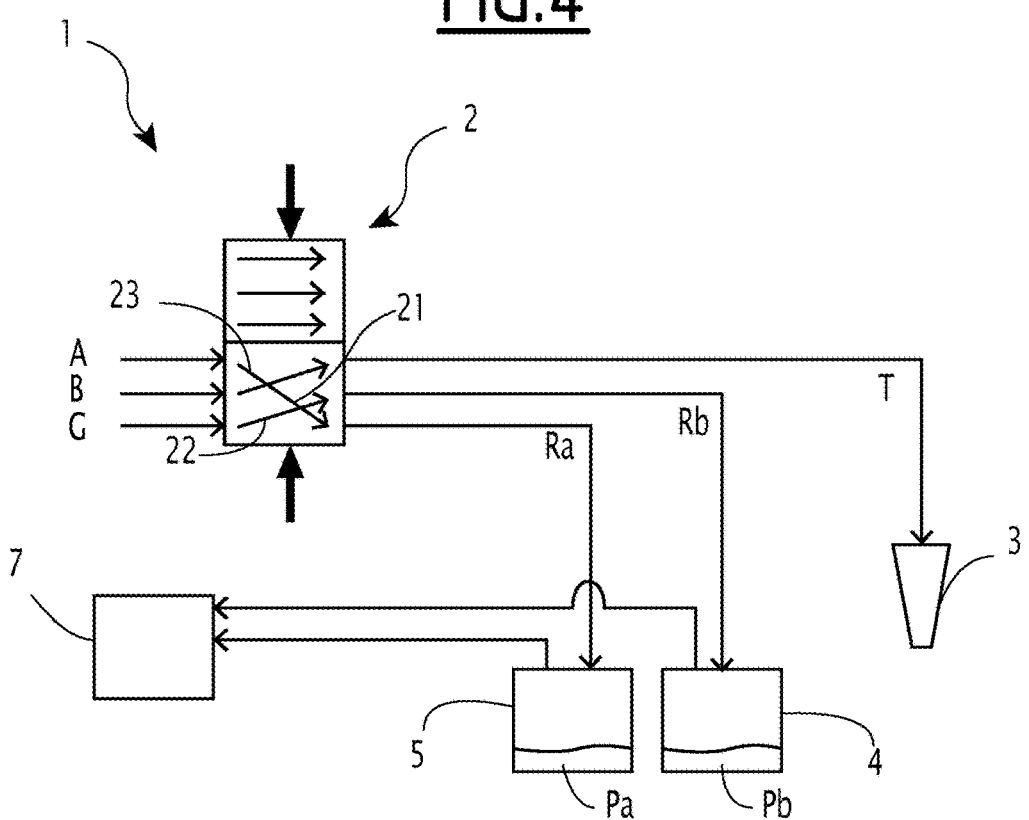
Figure 6:
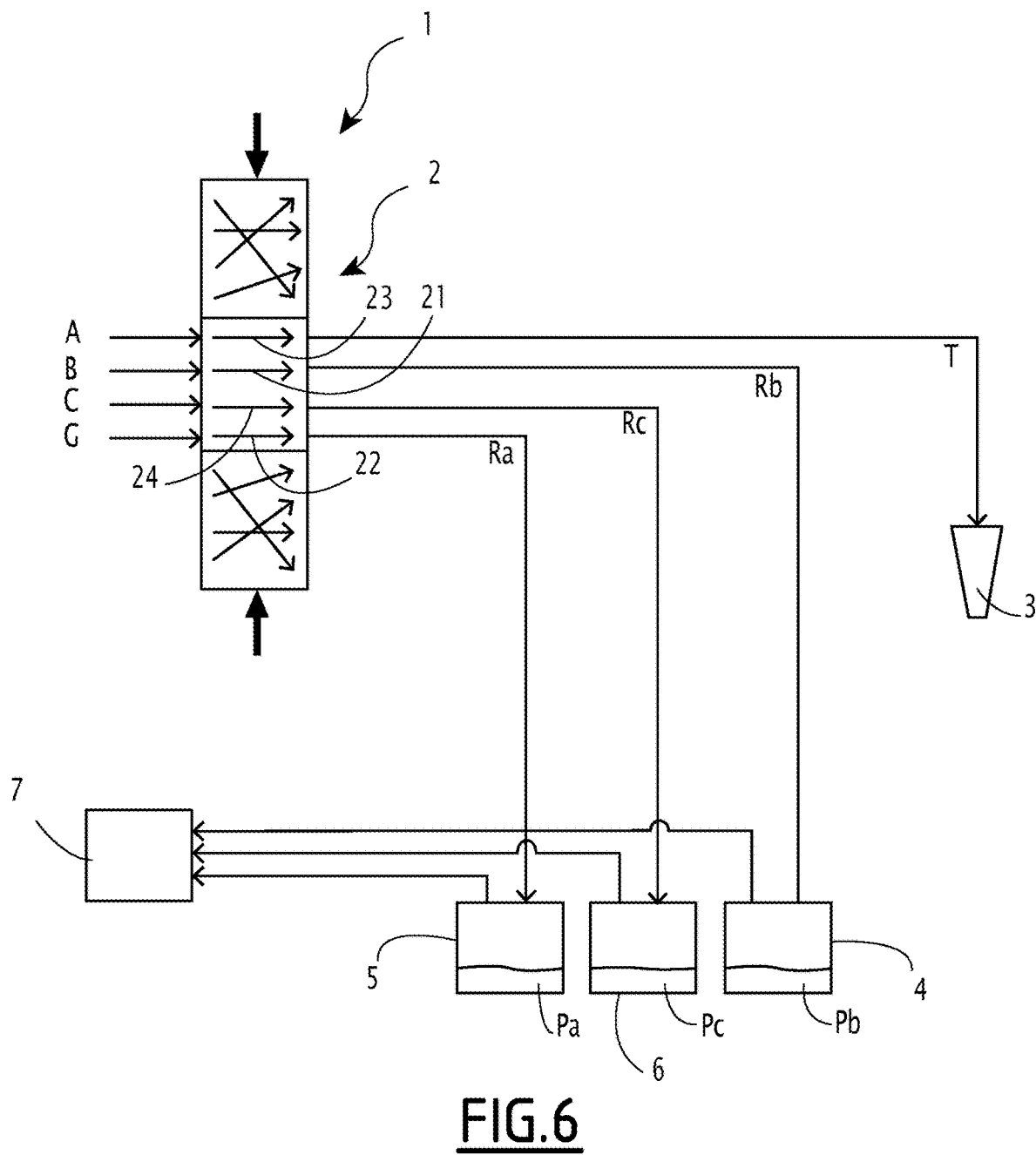
Figure 7:
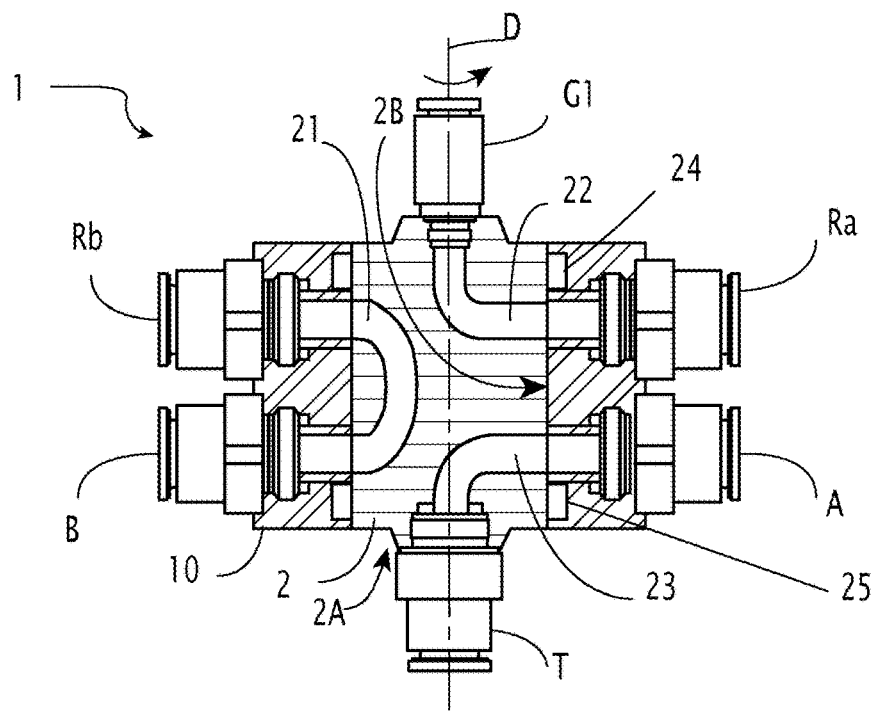
Figure 8:
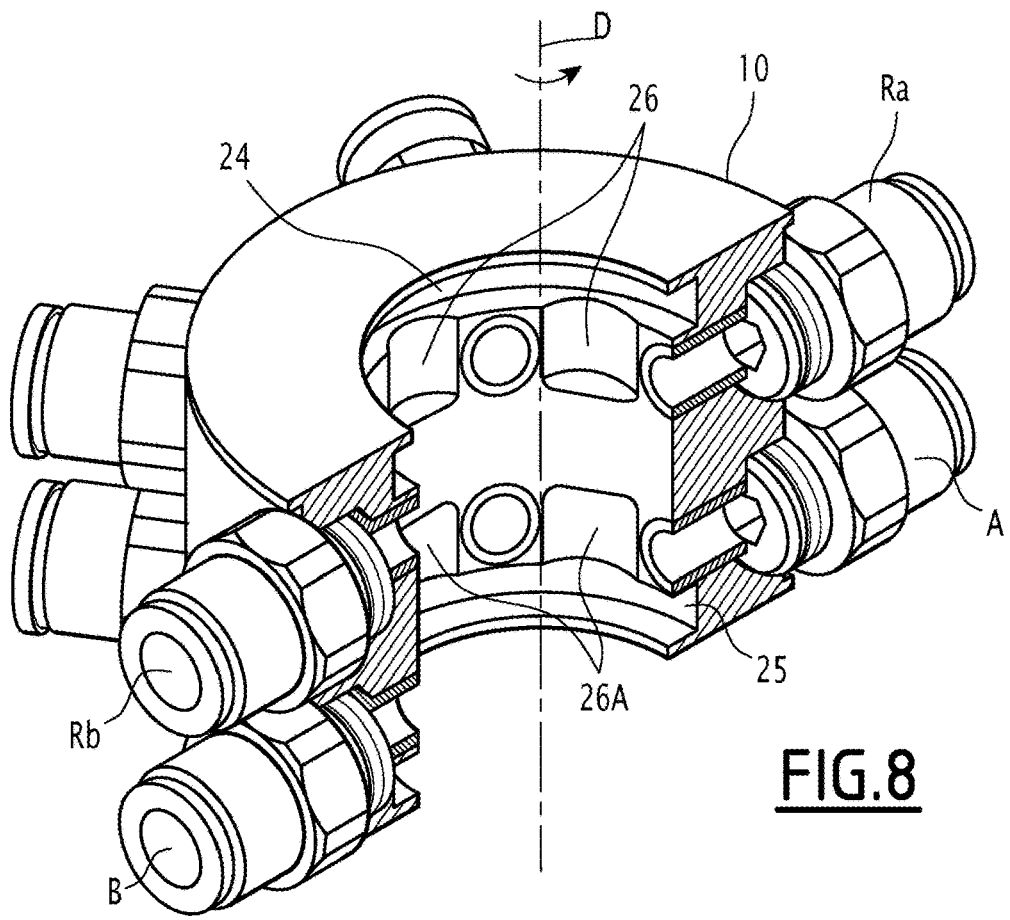

These features and advantages of the invention will appear upon reading the following description, provided solely as a non-limiting example, done in reference to the appended drawings, in which:

FIG. 1 is a schematic illustration of a 3D printing facility according to the invention, FIG. 2 is a perspective view of the two-way switching system shown in FIG. 1, FIG. 3 is a vertical sectional view of the switching system shown in FIGS. 1 and 2, FIGS. 4 and 5 are operating diagrams of the switching system shown in FIGS. 1 to 3, respectively in two positions of the distributor of the switching system, FIG. 6 is an operating diagram of another switching system according to the invention implementing three powders, and FIG. 7 is a vertical sectional view of another switching system according to the invention implementing six powders, and FIG. 8 is a perspective view cut to show an inner housing of the body of the switching system shown in FIG. 7.

DETAILED DESCRIPTION OF THE INVENTION

A facility for 3D printing 100 according to the invention is disclosed in reference to FIG. 1. The invention nevertheless applies to all sectors involving the transfer of powder irrespective of the additive manufacturing technology, in particular SLM printing.

The facility 100 comprises a printing head 102 including a nozzle 3 configured to deposit powders Pa, Pb in order to manufacture an object 104, and recuperators 4, 5 in order to recover the powders Pa, Pb. The facility 100 also comprises a laser source 106, a source 108 of powder Pa, a source 110 of powder Pb, a gas source 112, and a switching system 1 configured to switch from one powder to the other.

The facility 100 lastly comprises a movement system 114 in order to move the printing head 112 at least vertically, a movement system 116 configured to move the object 104 in two horizontal directions, and a control system 118 configured to control the facility 100.

Various metal powders such as: steels and stainless steels, or all metal alloys, for example nickel bases, cobalt bases, alloys of titanium, copper or aluminum, ceramics, intermetallic compounds, as well as polymers or other composites, can be used separately or in separate layers in order to manufacture complete parts, to repair worn parts, or as surface coverings for metal parts. The methods can vary depending on the desired characteristics and the use of the part to be manufactured, such that the supply of an additive manufacturing nozzle of the LMD type often requires several separate powder distributors to be connected as needed.

In reference to FIGS. 2 to 5, the switching system 1 comprises two upstream conduits or lines A and B for powders Pa and Pb, two downstream conduits Ra and Rb for discharging powders Pa and Pb, two upstream gas conduits G1 and optionally G2 depending on the configuration of the tap, and a downstream work conduit T connected to the nozzle 3 for depositing or spraying powder Pa or Pb. This switching system 1 is positioned as close as possible to the nozzle 3 for spraying powder toward the laser in order to minimize the powder losses during powder changes or switching from an ON mode (during operation) to an OFF mode (when stopped) of the powder flow rate and to reduce the response time to changes in the manufacturing process.

FIG. 3 shows the inside of the switching system 1. The switching system 1 comprises a body 10 defining the upstream conduits A, B, G1, G2, the downstream conduits Ra, Rb, and the downstream work conduit T.

According to one specific embodiment, the body 10 also defines bleed conduits RG1, RG2 (FIG. 2).

Seen along an axis D of the switching system 1, the conduits A and Ra, on the one hand, and the conduits B and Rb, on the other hand, are substantially diametrically opposite one another. Likewise, the conduits G1 and RG1, on the one hand, and G2 and RG2, on the other hand, are substantially diametrically opposite.

Still seen along the axis D, the upstream gas conduits G1 and G2 are arranged at a substantially right angle, the conduit G1 being located angularly at an equal distance between the upstream conduit A and the discharge conduit Rb, and the conduit G2 being located between the conduits A and B.

The downstream work conduit T extends substantially in the extension of the axis D.

According to the invention, the switching system 1 comprises, at its center, a distributor 2 that is movable relative to the body 10, advantageously in rotation along an axis D, between a first supply position, shown in FIGS. 2 to 4, a second supply position, shown in FIG. 5, and a rest or cleaning position (not shown, but able to be deduced from the previous ones by a rotation of the distributor 2).

The axis D here is a longitudinal axis of the switching system 1, advantageously vertical.

In this example, the distributor 2 is in the form of a conical central bush, but could be cylindrical or even spherical or hemispherical in a variant.

The distributor 2 defines inner channels 21, 22 and 23 that place the upstream conduits A, B, G1, G2 in fluid relation with the downstream conduits Ra, Rb, T.

As shown in FIG. 3, the channel 21 goes straight in order to send the powder Pb directly from the upstream conduit B to the downstream conduit Rb in order to be recycled. The channel 22 turns substantially 45° to the horizontal in order to obtain a 135° angle between the beginning and the end of the channel 22. The latter for example passes above the channel 21 in order to send gas from G1 into the bleed line Ra. The channel 23 is supplied by the conduit A and steers the powder flow Pa toward the downstream work conduit T in order to supply the nozzle 3.

By rotation of the distributor 2 about the axis D, the connections of the channels 21, 22 and 23 with the upstream and downstream conduits change. The channel 23 is connected, as desired, to the upstream conduit A in order to receive the powder Pa, to the upstream conduit B in order to receive the powder Pb, or to the upstream gas conduit G1 in order to bleed the downstream work conduit T of any powder residue. The other channels 21 and 22 are used to deviate an unused powder flow or to bleed a downstream conduit. The distributor 2 is rotated along the axis D by any type of mechanical system, in particular jack, electric motor, magnetic actuator, etc.

FIG. 4 shows an operating diagram of the distributor 2, with two types of powder and three possible positions of the distributor. The positions are assumed as a function of the rotations of the distributor 2. In FIG. 4, the assumed position is a first supply position that makes it possible to use the powder Pa as work powder, since it is sent directly from the upstream conduit A to the nozzle 3 by the downstream work conduit T and the channel 23 of the distributor 2.

The conduit B supplied with powder Pb is connected to the downstream conduit Rb by the channel 21. The powder Pb is recovered in the powder Pb recuperator 4. The upstream gas conduit 1 is connected to the downstream conduit Ra by the channel 22 of the distributor 2. This connection has the advantage of cleaning the downstream conduit Ra by blowing gas, thus avoiding clogging of this conduit.

The powder Pa is recovered by the recuperator 5 specific to the powder Pa. A suction and filtration unit 7 of the gas is connected at the outlet of the recuperators 4 and 5 (FIGS. 4 to 6).

FIG. 5 shows the same switching system 1 in a second supply position making it possible to convey the powder Pb toward the nozzle 3. The downstream conduit B is coupled to the downstream work conduit T via the channel 23 of the distributor 2. The powder Pa continues to arrive via the upstream conduit A, but is deviated toward the downstream conduit Ra by the channel 21, so as to recycle it and keep a circulation of powder for more reactivity during powder changes at the nozzle 3. The upstream conduit G1 connected to the channel 22 cleans the downstream conduit Rb to avoid the deposition of powder Pb.

The downstream work conduit T is then advantageously supplied only with gas by the upstream gas conduit G1 and the channel 23, which results in stopping the injection of powder and cleaning the downstream conduit T up to the nozzle 3 at the time of the change of position between A and B.

Likewise, the channel 21 is traveled through by the pure gas coming from the conduit G1 in an intermediate position, during the transition between the first supply position and the second supply position. The gas is then discharged toward the bleed conduit RG1.

In another intermediate position, the gas coming from the conduit G2 circulates in the channel 21 and is discharged through the bleed conduit RG2.

This intermediate position of the distributor 2 comes into play during the transition from the powder supply A to the powder supply B. In this case, a brief supply cutoff A and B occurs while the channel 23 passes over a conduit G1 or G2, in order to clean the downstream conduit T up to the nozzle 3.

During normal use, the upstream conduits A or B are only activated 15 to 20 seconds before the actual need to use powder Pa or Pb. The switching from powder Pa to powder Pb, and vice versa, is done by switching the distributor from an active line (for example A) to an inactive line (for example B). It is rare, but possible, for the lines A and B to be unused at the same time and for immediate switching from A to B to be useful. For bi-component uses, a 3-way distributor is more appropriate (see FIGS. 7 and 8 for an example of a six-way distributor).

In order to avoid the wear of the conduits and carrier gas waste, the powder distributor and the gas circulation in the unused circuits are activated and deactivated several seconds before and after the actual need to use each powder.

FIG. 6 shows another operating diagram according to another exemplary embodiment of the invention with the use of three different powders Pa, Pb, Pc. In this example, the switching system 1 is similar to that shown in FIGS. 1 to 5. Only the differences are described below.

The switching system 1, in this example, connects three upstream powder conduits A, B, C, an upstream gas conduit G1 with three downstream discharge conduits and one downstream work conduit T. In order to allow this connection, the switching system 1 comprises a distributor 2 having four connection channels 21, 22, 23, 24. The distributor 2 can assume four different positions in order to ensure the operation of the system 1 and steer the appropriate powder toward the nozzle 3 at the right moment according to the manufacturing plan.

FIG. 7 shows an operating diagram according to another exemplary embodiment of the invention, similar to those shown in FIGS. 1 to 6. Only the differences are described below.

In this example, the switching system 1 includes six separate powder supply lines, and six recycling lines.

This example shows how a system of interline cells 26, 26A (FIG. 8) makes it possible, on the one hand, to clean the inner channels of the distributor 2 between each passage from one line to the other, owing to a contribution of pure gas on a circular groove 24, and on the other hand, to collect the powder residues that may have been trapped in the circuits at the time of the line change on a second circular groove 25.

The number of conduits of the switching system 1 and channels of the distributor 2 can be increased in order to use a certain number of different powders to supply the nozzle 3 on demand, automatically, without change in cabling, and without powder loss.

By supplying gas only to a line located between two powder supply lines, one advantageously benefits from a "rest" position that can be extended, at the time of the position change between the two supply lines or a cutoff of the laser beam done between two firings.

A rotating distributor seems best suited to allow the integration of these conduits and channels, but also to meet the need for compactness of the switching system 1. Indeed, the compactness of the switching system 1 allows it to be placed as close as possible to the 3D printing head.

According to another embodiment of the invention, the switching system 1 uses a distributor 2 moving not in rotation, but in translation, for example horizontal or vertical, relative to the body 10, connecting the upstream and downstream conduits via inner channels of the distributor. The distributor 2 can therefore assume any form allowing this functionality, in particular a parallelepiped rectangular shape.

According to the invention, the number of powders used is not limiting.

The invention claimed is:

1. A switching system for a facility for 3D printing by spraying at least a first powder and a second powder that is different from the first powder, the switching system comprising a single body defining:
   at least one first upstream gas conduit configured to receive a gas,
   at least one first upstream powder conduit configured to receive the first powder,
   a second upstream powder conduit configured to receive the second powder,
   at least one first downstream discharge conduit for discharging the first powder,
   a second downstream discharge conduit for discharging the second powder, and
   a downstream work conduit configured in order to supply a nozzle designed for depositing at least the first powder,
   further comprising a distributor that is movable with respect to the single body between a rest position, in which the first upstream powder conduit is fluidly connected to the first downstream discharge conduit by the distributor, and at least a first supply position, in which the first upstream powder conduit is fluidly connected to the downstream work conduit by the distributor,
   wherein the second upstream powder conduit is fluidly connected by the distributor to the second downstream discharge conduit in the first supply position, and
   wherein the distributor is movable relative to the single body toward a second supply position, in which the second upstream powder conduit is fluidly connected by the distributor to the downstream work conduit and in which the first upstream powder conduit is fluidly connected by the distributor to the first downstream discharge conduit.

2. The switching system according to claim 1, wherein the distributor defines:
   an inner channel configured to place the first upstream powder conduit in fluid continuity with the downstream work conduit in the first supply position, and
   an inner channel configured to place the first upstream powder conduit in fluid continuity with the first downstream discharge conduit in the rest position.

3. The switching system according to claim 2 wherein:
   in the first supply position, the first upstream gas conduit is connected by the distributor to the first downstream discharge conduit, and
   in the rest position, the first upstream gas conduit is fluidly connected by the distributor to the downstream work conduit.

4. The switching system according to claim 1 wherein:
   in the first supply position, the first upstream gas conduit is connected by the distributor to the first downstream discharge conduit, and
   in the rest position, the first upstream gas conduit is fluidly connected by the distributor to the downstream work conduit.

5. The switching system according to claim 4, wherein the first upstream gas conduit is connected to the first downstream discharge conduit by an inner channel defined by the distributor.

6. The switching system according to claim 1, wherein the distributor defines:
an inner channel configured to place the first upstream powder conduit in fluid continuity with the downstream work conduit in the first supply position, and to place the second upstream powder conduit in fluid continuity with the downstream work conduit in the second supply position, and
an inner channel configured to place the first upstream powder conduit in fluid continuity with the first downstream discharge conduit in the second supply position, and to place the second upstream powder conduit in fluid continuity with the second downstream discharge conduit in the first supply position.

7. The switching system according to claim 6, wherein:
the single body further defines a second upstream gas conduit configured to receive a gas,
in the second supply position, the second upstream gas conduit is connected by the distributor to the first downstream discharge conduit.

8. The switching system according to claim 1, wherein:
the single body further defines a second upstream gas conduit configured to receive a gas,
in the second supply position, the second upstream gas conduit is connected by the distributor to the first downstream discharge conduit.

9. The switching system according to claim 8, wherein, in the second supply position, the second upstream gas conduit is connected to the first downstream discharge conduit by an inner channel defined by the distributor.

10. The switching system according to claim 1, wherein the single body defines:
N upstream powder conduits configured to receive N powders that are distinct from each other and configured to be sprayed by the 3D printing facility, N being an integer greater than or equal to 3,
N downstream discharge conduits configured respectively to discharge the N powders,
the distributor being movable relative to the single body between at least N supply positions, in which respectively one of the N upstream powder conduits is fluidly connected by the distributor to the downstream work conduit and in which the others of the N upstream powder conduits are fluidly connected by the distributor respectively to the downstream discharge conduits.

11. The switching system according to claim 10, wherein the single body defines a housing receiving the distributor, the housing being delimited by a radially inner wall of the single body, the wall defining:
a first circular groove configured to form a first gas collector, the wall further defining cells in fluid communication with the first groove and configured to be across from the N downstream discharge conduits, and/or
a second circular groove configured to form a second gas collector, the wall further defining cells in fluid communication with the second groove and configured to be across from the N upstream powder conduits.

12. The switching system according to claim 1, wherein the distributor is movable with respect to the single body in rotation about an axis between the rest position and the first supply position.

13. The switching system according to claim 1, wherein the distributor is movable relative to the single body in rotation about an axis toward the second supply position.

14. A facility for 3D printing by spraying at least a first powder, the facility for 3D printing comprising:
a switching system according to claim 1, and
the nozzle designed for depositing at least the first powder, the nozzle being configured to be supplied with the first powder by the downstream work conduit in the supply position.

15. A powder switching method, configured to be implemented in a facility for 3D printing by spraying at least a first powder, the method comprising the following steps:
providing a switching system according to claim 1,
placing the distributor in the first supply position,
receiving the gas via the first upstream gas conduit,
receiving the first powder in the first upstream powder conduit,
supplying the nozzle with the first powder via the downstream work conduit, and depositing the first powder via the nozzle,
placing the distributor in the rest position, and
discharging the first powder via the first downstream discharge conduit.

16. The method according to claim 15, wherein:
in the step of providing the switching system, the single body defines a plurality of upstream powder conduits configured to receive a plurality of powders that are distinct from each other, a plurality of downstream discharge conduits to respectively discharge the powders, the distributor being movable relative to the single body between a plurality of supply positions, in which one of the upstream powder conduits is respectively fluidly connected by the distributor to the downstream work conduit and in which the others of the upstream powder conduits are fluidly connected by the distributor to the downstream discharge conduits,
the method implements a plurality of supply sources supplying the powders, and
the distributor is moved between the plurality of positions.

17. The method according to claim 16, wherein the distributor is movable relative to the single body in rotation about an axis between the plurality of supply positions.

* * * * *